US012775222B2

(12) United States Patent
Tanaka et al.

(10) Patent No.: US 12,775,222 B2
(45) Date of Patent: Oct. 27, 2026

(54) TONER AND METHOD FOR PRODUCING THE TONER

(71) Applicant: CANON KABUSHIKI KAISHA, Tokyo (JP)

(72) Inventors: Masatake Tanaka, Kanagawa (JP); Shohei Tsuda, Shizuoka (JP); Tatsuya Saeki, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 806 days.

(21) Appl. No.: 17/814,089

(22) Filed: Jul. 21, 2022

(65) Prior Publication Data

US 2023/0042289 A1 Feb. 9, 2023

(30) Foreign Application Priority Data

Jul. 28, 2021 (JP) ................................ 2021-123719

(51) Int. Cl.
*G03G 9/097* (2006.01)
*G03G 9/08* (2006.01)

(52) U.S. Cl.
CPC ....... *G03G 9/09708* (2013.01); *G03G 9/0827* (2013.01); *G03G 9/09725* (2013.01)

(58) Field of Classification Search
CPC ............. G03G 9/09708; G03G 9/0827; G03G 9/09725
See application file for complete search history.

(56) References Cited

U.S. PATENT DOCUMENTS 7,537,877 B2 5/2009 Yoshiba
7,544,455 B2 6/2009 Yoshiba
7,700,254 B2 4/2010 Moribe
7,740,998 B2 6/2010 Yamazaki
7,796,926 B2 9/2010 Matsuda
7,855,042 B2 12/2010 Kobori
7,858,282 B2 12/2010 Ayaki
8,057,977 B2 11/2011 Moribe
8,372,573 B2 2/2013 Ayaki
8,383,313 B2 2/2013 Ayaki
8,551,680 B2 10/2013 Ayaki
9,097,998 B2 8/2015 Yamazaki
9,128,400 B2 9/2015 Takahashi
9,201,323 B2 12/2015 Nishikawa
9,250,548 B2 2/2016 Nomura
9,261,804 B2 2/2016 Yamazaki
9,341,970 B2 5/2016 Yoshiba
9,423,708 B2 8/2016 Tominaga
9,606,462 B2 3/2017 Nomura
9,632,441 B2 4/2017 Abe
9,720,340 B2 8/2017 Tominaga
9,733,583 B2 8/2017 Kuroki
9,733,584 B2 8/2017 Masumoto
9,785,077 B2 10/2017 Abe
9,829,818 B2 11/2017 Yoshiba
9,829,820 B2 11/2017 Masumoto
9,897,932 B2 2/2018 Hotta
9,921,501 B2 3/2018 Mochizuki
9,971,263 B2 5/2018 Fukudome
10,101,683 B2 10/2018 Nishikawa
10,114,303 B2 10/2018 Katsura
10,241,430 B2 3/2019 Kimura
10,289,016 B2 5/2019 Fukudome
10,295,921 B2 5/2019 Ohmori
10,303,074 B2 5/2019 Yamawaki
10,429,757 B2 10/2019 Yoshida
10,503,090 B2 12/2019 Tominaga
10,545,422 B2 1/2020 Yamawaki
10,578,990 B2 3/2020 Tsuda
10,635,011 B2 4/2020 Umeda
10,678,155 B2 6/2020 Terui
10,732,529 B2 8/2020 Yoshiba
10,747,133 B2 8/2020 Yagi
10,747,134 B2 8/2020 Watanabe
10,768,540 B2 9/2020 Watanabe
10,782,623 B2 9/2020 Yoshiba
10,809,639 B2 10/2020 Yamawaki
10,845,721 B2 11/2020 Tanaka
10,942,463 B2 3/2021 Yoshiba
10,942,465 B2 3/2021 Kototani
10,942,466 B2 3/2021 Tominaga
10,969,704 B2 4/2021 Kagawa
10,976,679 B2 4/2021 Tanaka
(Continued)

FOREIGN PATENT DOCUMENTS

CN 1495549 A 5/2004
CN 101382747 A 3/2009
(Continued)

OTHER PUBLICATIONS

Takeshi, Machine Translation of Jp 2004-287185A, Oct. 14, 2004 (Year: 2004).*
U.S. Appl. No. 17/655,414, filed Mar. 18, 2022, Hidekazu Fumita.
U.S. Appl. No. 17/814,094, filed Jul. 21, 2022, Shohei Tsuda.
U.S. Appl. No. 17/814,143, filed Jul. 21, 2022, Tatsuya Saeki.
U.S. Appl. No. 17/935,721, filed Sep. 27, 2022, Takashi Kenmoku.
U.S. Appl. No. 17/936,104, filed Sep. 28, 2022, Tatsuya Saeki.
U.S. Appl. No. 17/936,943, filed Sep. 30, 2022, Kozue Uratani.

* cited by examiner

*Primary Examiner* — Peter L Vajda
*Assistant Examiner* — Jenna Kuipers
(74) *Attorney, Agent, or Firm* — VENABLE LLP

(57) ABSTRACT

A toner comprising a toner particle comprising a binder resin and boric acid, wherein the toner has an average circularity of 0.95 or more, and the toner has a shape factor SF1 of 105 to 125, and a method for producing to provide a toner with excellent durability for which the improvement of transfer rate with the above physical characteristics.

9 Claims, No Drawings

(56) References Cited

U.S. PATENT DOCUMENTS

| | | | |
|---|---|---|---|
| 11,003,104 B2 | 5/2021 | Katsura | |
| 11,003,105 B2 | 5/2021 | Sato | |
| 11,099,493 B2 | 8/2021 | Komiya | |
| 11,112,709 B2 | 9/2021 | Saeki | |
| 11,112,713 B2 | 9/2021 | Akiyama | |
| 11,169,460 B2 | 11/2021 | Kototani | |
| 11,181,844 B2 | 11/2021 | Nagaoka | |
| 11,249,408 B2 | 2/2022 | Tsuda | |
| 11,262,666 B2 | 3/2022 | Yoshiba | |
| 2004/0053154 A1 | 3/2004 | Tomita et al. | |
| 2005/0255399 A1 | 11/2005 | Ichikawa | |
| 2007/0231724 A1 | 10/2007 | Kimura et al. | |
| 2008/0227003 A1 | 9/2008 | Honda et al. | |
| 2009/0196658 A1 | 8/2009 | Sugiura | |
| 2012/0052430 A1 | 3/2012 | Yamasaki | |
| 2013/0137029 A1 | 5/2013 | Kadonome et al. | |
| 2013/0171551 A1 | 7/2013 | Sun | |
| 2013/0252167 A1 | 9/2013 | Moribe | |
| 2014/0004460 A1 | 1/2014 | Yoshiba | |
| 2014/0295341 A1 | 10/2014 | Fomitchev | |
| 2015/0220013 A1 | 8/2015 | Nishikawa | |
| 2015/0248072 A1 | 9/2015 | Katsuta | |
| 2016/0161874 A1 | 6/2016 | Yamazaki | |
| 2017/0010547 A1* | 1/2017 | Bejat | G03G 9/09378 |
| 2019/0243272 A1 | 8/2019 | Sakurada et al. | |
| 2020/0064751 A1 | 2/2020 | Murayama | |
| 2020/0073266 A1 | 3/2020 | Ohtsu | |
| 2020/0209769 A1 | 7/2020 | Nomura et al. | |
| 2020/0209771 A1* | 7/2020 | Hashimoto | G03G 9/0825 |
| 2020/0285169 A1 | 9/2020 | Kubo | |
| 2021/0223731 A1 | 7/2021 | Suzuki | |
| 2021/0255557 A1 | 8/2021 | Watanabe et al. | |
| 2021/0373450 A1 | 12/2021 | Kawaguchi | |
| 2021/0397110 A1 | 12/2021 | Katsura | |
| 2022/0121132 A1 | 4/2022 | Yoshida | |
| 2022/0121133 A1 | 4/2022 | Yamawaki | |
| 2022/0128916 A1 | 4/2022 | Yoshida | |
| 2022/0171302 A1 | 6/2022 | Sato | |
| 2022/0291601 A1 | 9/2022 | Katsura | |
| 2023/0004099 A1 | 1/2023 | Seino | |
| 2023/0042289 A1 | 2/2023 | Tanaka | |
| 2023/0051836 A1 | 2/2023 | Tominaga | |
| 2023/0065610 A1 | 3/2023 | Yoshiba | |

FOREIGN PATENT DOCUMENTS

| | | | | |
|---|---|---|---|---|
| CN | 111381461 A | 7/2020 | | |
| CN | 111381470 A | 7/2020 | | |
| EP | 3674806 A1 | * | 7/2020 | G03G 9/0819 |
| JP | 8-248670 A | 9/1996 | | |
| JP | 2001-13732 A | 1/2001 | | |
| JP | 2001-228650 A | 8/2001 | | |
| JP | 2002-278150 A | 9/2002 | | |
| JP | 2002-357920 A | 12/2002 | | |
| JP | 2004-279771 A | 10/2004 | | |
| JP | 2004-279772 A | 10/2004 | | |
| JP | 2004287185 A | * | 10/2004 | |
| JP | 2007-25525 A | 2/2007 | | |
| JP | 2007-241310 A | 9/2007 | | |
| JP | 2008-158176 A | 7/2008 | | |
| JP | 2009-186512 A | 8/2009 | | |
| JP | 2009-300848 A | 12/2009 | | |
| JP | 2010-85761 A | 4/2010 | | |
| JP | 2011-59261 A | 3/2011 | | |
| JP | 2012-47914 A | 3/2012 | | |
| JP | 2012-128020 A | 7/2012 | | |
| JP | 2013-20113 A | 1/2013 | | |
| JP | 2013-137508 A | 7/2013 | | |
| JP | 2015-506493 A | 3/2015 | | |
| JP | 2015-506494 A | 3/2015 | | |
| JP | 6059251 A | 1/2017 | | |
| JP | 2019-159001 A | 9/2019 | | |
| JP | 2020-34901 A | 3/2020 | | |
| JP | 2020-106816 A | 7/2020 | | |
| WO | 2013/063291 A1 | 5/2013 | | |

TONER AND METHOD FOR PRODUCING THE TONER

BACKGROUND OF THE INVENTION

Field of the Invention

The present disclosure relates to a toner suitable for an image forming method such as an electrophotographic method, an electrostatic recording method, and a toner jet method, and to a method for producing the toner.

Description of the Related Art

In recent years, printers and copiers have achieved high levels of image quality and durability, and at the same time, miniaturization and waste-free operation have been widely required in particular for printers.

A printer must be adaptable to various business situations such as network printers used by a large number of people via a network and personal printers used in SOHO and the like. Further, in an office or SOHO environment, elimination of maintenance related to waste generation such as waste toner replacement is strongly desired. Therefore, there is still a strong demand for space-saving printers, that is, for miniaturization and waste-free operation of printers.

Miniaturization of fixing device and process cartridge is mainly effective for miniaturizing a printer. In particular, a process cartridge occupies most of the volume of the printer, and the miniaturization of the process cartridge can greatly contribute to the miniaturization of the printer.

Miniaturization of developing device and cleaning device is effective for miniaturizing a printer. Regarding the miniaturization of the developing device, there are two-component and one-component electrophotographic developing systems, but it is the one-component developing system that is suitable for miniaturization. This is because members such as carriers are not used.

Regarding the cleaning device, a cleaner-less system that does not have a cleaning device at all is very suitable for miniaturizing the process cartridge. In many printers, the toner (transfer residual toner) on an electrostatic latent image bearing member (photosensitive member) remaining in a transfer step is scraped off by a cleaning blade or the like and collected in a cleaning container to become waste toner. Meanwhile, in the cleaner-less system, there is no cleaning blade or cleaning container, and the transfer residual toner is collected again in the developing device and contributes to development, so the process cartridge can be significantly reduced in size, no waste toner is generated, and significant contribution is made to a transition to wasteless operation.

Against such a background, a toner with a small transfer residue is very important regardless of the presence or absence of a cleaning device. Generally, a method for obtaining a toner having a small transfer residue can be exemplified by spheroidization of toner particles that reduces adhesion to a photosensitive member, but since the spheroidization also reduces the adhesion between the toner particles, transfer dust is likely to occur. To resolve this problem, Japanese Patent Application Publication No. 2007-241310 proposes a toner for which both improvement in transfer rate and reduction in transfer dust are achieved by controlling the surface shape of the toner.

SUMMARY OF THE INVENTION

Although according to Japanese Patent Application Publication No. 2007-241310 it is possible to obtain a toner for which both improvement in transfer rate and reduction in transfer dust are achieved, this cannot be said to be sufficient for contemporary printers that require a long life. Furthermore, a toner of irregular shape such as proposed in Japanese Patent Application Publication No. 2007-241310 is susceptible to excessive force locally when rubbed with a blade or roller during development and cannot be said to be sufficient in terms of durability.

A problem to be solved by the present disclosure is to provide a toner with excellent durability for which the improvement of transfer rate, which can contribute to the miniaturization of printer and a transition to waste-less operation, and the reduction of transfer dust are achieved at a high level and these transfer performances are maintained for a long period of time, and also to provide a method for producing the toner.

The present disclosure relates to a toner comprising a toner particle comprising a binder resin and boric acid, wherein the toner has an average circularity of 0.95 or more, and the toner has a shape factor SF1 of 105 to 125.

The present disclosure also relates to a method for producing the toner, wherein the method for producing the toner has following steps (1) to (3) in the following order:

(1) a dispersion step of preparing a binder resin fine particle-dispersed solution comprising the binder resin, (2) an aggregation step of aggregating the binder resin fine particles comprised in the binder resin fine particle-dispersed solution to form an aggregate, and (3) a fusion step of heating and fusing the aggregate, and a boric acid source is added in at least one of the aggregation step and the fusion step.

The present disclosure provides a toner with excellent durability for which the improvement of transfer rate and the reduction of transfer dust are achieved at a high level and these transfer performances are maintained for a long period of time.

Further features of the present invention will become apparent from the following description of exemplary embodiments.

DESCRIPTION OF THE EMBODIMENTS

In the present disclosure, the expression of "from XX to YY" or "XX to YY" indicating a numerical range means a numerical range including a lower limit and an upper limit which are end points, unless otherwise specified. Also, when a numerical range is described in a stepwise manner, the upper and lower limits of each numerical range can be arbitrarily combined.

In the present disclosure, "(meth)acrylic" means "acrylic" and/or "methacrylic".

The toner of the present disclosure will be described in more detail hereinbelow.

As a result of diligent studies conducted to solve the aforementioned problems of the related art, the present inventors have found that the above problems can be resolved by a toner that comprises a toner particle including a binder resin, wherein the toner is controlled to a specific shape, and the toner particles comprise boric acid.

The present disclosure relates to a toner comprising a toner particle comprising a binder resin and boric acid, wherein the toner has an average circularity of 0.95 or more, and the toner has a shape factor SF1 of 105 to 125.

First, by setting the average circularity of the toner to 0.95 or more and the shape factor SF1 to from 105 to 125, a toner having a high transfer rate can be obtained. Meanwhile, a toner having a shape in the above range creates transfer dust. However, the presence of boric acid in the toner particle having a shape in the above range makes it possible to improve the transfer rate and reduce the transfer dust at a high level. This is conceivably because boron derived from boric acid has a metalloid property, so that appropriate charge transfer is performed between the toner particles or within the toner particles, electrostatic repulsion between the developed toner particles is suppressed, and transfer proceeds in an aggregated state.

In order to obtain the toner shape, it is preferable to use a chemical toner production method for obtaining toner particles in an aqueous medium such as an emulsion aggregation method or a suspension polymerization method. Specifically, the abovementioned toner shape can be obtained through a spheroidization step, a cooling step, and an annealing step in the production process.

The spheroidization step is exemplified by a heat treatment step in which heat treatment is performed, for example, at 90° C. or higher, preferably 92° C. or higher, and preferably 95° C. or lower.

The cooling step is exemplified by cooling treatment performed at a cooling rate of 0.1° C./sec or higher, preferably 0.5° C./sec or higher, more preferably 2° C./sec or higher, and still more preferably 4° C./sec or higher.

The annealing step is exemplified by a heat treatment step in which heat treatment is performed within 5 h at a temperature at which the glass transition temperature (Tg) of the toner is maximized. Through these steps performed under appropriate conditions, the toner shape of the present disclosure can be easily achieved. In particular, in order to obtain the shape factor SF1 of the cross section of the toner formed by a cross-section polisher cross section method (CP cross section method) of from 105 to 125, and the below-described contact area ratio (D/S) of the toner of 14% or less, it is preferable to go through the cooling step and the annealing step. By going through these steps, it is possible to suppress the formation of dents on the toner surface, and it is easy to reduce the shape factor SF1 of the cross section to 125 or less and the contact area ratio (D/S) to 14% or less.

The average circularity of the toner is 0.95 or more, preferably 0.97 or more, and more preferably 0.98 or more. Further, the average circularity is preferably 0.99 or less. The shape factor SF1 of the toner is from 105 to 125, and preferably from 108 to 120.

When the average circularity of the toner and the shape factor SF1 are within the above ranges, the shape of the toner is a sphere close to a true sphere, so that adhesion of the toner to the photosensitive member is suppressed and the transfer rate is improved.

The value of the shape factor SF1 of the toner cross section formed by the cross-section polisher cross section method (CP cross section method) is preferably from 105 to 125, and more preferably from 108 to 120. The shape factor SF1 of the cross section can be controlled by changing the above production conditions. When the shape factor SF1 of the cross section is in the above range, the toner surface has few irregularities, and a local external force is unlikely to be applied to the peaks and valleys, so that toner durability is greatly improved and transfer performance such as improvement of transfer rate and reduction of transfer dust can be maintained for a long period of time.

When the toner is dropped and laid on a horizontal glass flat plate from a position at 10 cm thereabove while sieving with a 22-μm-opening mesh for 10 sec, and a total area of the contact surface between the 50 toners and the glass flat plate is defined as contact area D, and a total projected area of the 50 toners is defined as S, the contact area ratio (D/S) is preferably from 3 to 14%, and more preferably from 5 to 8%. The contact area ratio (D/S) can be controlled by changing the above production conditions. When the contact area ratio (D/S) is within the above range, the toner surface has few irregularities, and a local external force is unlikely to be applied to the peaks and valleys, so that toner durability is greatly improved and transfer performance such as improvement of transfer rate and reduction of transfer dust can be maintained for a long period of time.

It is preferable that the toner further comprises an external additive, the external additive comprises a silica fine particle, and the coverage ratio of the toner particle surface with the silica fine particles measured by an X-ray photoelectron spectrometer be from 50 to 80% by area, and more preferably from 60 to 70% by area. When the coverage ratio is in the above range, the local charge difference generated between the portions covered by the external additive and non-covered portions is suppressed, so that transfer dust can be further reduced and transferability can be improved. The coverage ratio with the silica fine particles can be controlled by adjusting the addition amount of the silica fine particles, the external addition time, or the like.

The dispersity evaluation index of the silica fine particle on the toner surface is preferably from 0.10 to 2.00, and more preferably from 0.20 to 0.40. By setting the above range, the portions covered by the external additive and non-covered portions is suppressed, so that transfer dust can be further reduced and transferability can be improved. The dispersity evaluation index can be controlled by adjusting the addition amount of the silica fine particles, the external addition time, or the like.

It is preferable that boric acid be detected in the IR analysis of the toner particle by an ATR method using germanium as an ATR crystal. This means that boric acid is present near the toner surface. When boric acid is present near the toner surface, appropriate charge transfer is performed between the toner particles or within the toner particle, electrostatic repulsion between the developed toner particles is suppressed, and the transfer is performed in an aggregated state. Therefore, transfer dust can be reduced and durability can be improved.

In the fluorescent X-ray measurement of toner particles, the intensity of boron is preferably from 0.1 to 0.6 kcps, and more preferably from 0.2 to 0.6 kcps. When the intensity of boron is within the above range, an appropriate amount of boric acid is contained in the toner particle, an appropriate amount of charge is transferred between the toner particles or within the toner particle, electrostatic repulsion between the developed toner particles is suppressed, and the transfer is performed in an aggregated state. Therefore, transfer dust can be reduced and durability can be improved.

Boric acid can be included in the toner particle by using a boric acid source as an internal additive or a flocculant. In particular, by adding a boric acid source as a flocculant, boric acid can be introduced in the vicinity of the toner particle surface.

The components constituting the toner and the method for producing the toner will be described hereinbelow in more detail.

Binder Resin

The toner particle comprises a binder resin. The amount of the binder resin is preferably 50% by mass or more with respect to the total amount of the resin components in the toner particle.

The binder resin is not particularly limited, and examples thereof include styrene acrylic resin, epoxy resin, polyester resin, polyurethane resin, polyamide resin, cellulose resin, polyether resin, mixed resins and composite resins thereof, and the like. Styrene acrylic resin and polyester resin are preferable because they are inexpensive, easily available, and enable excellent low-temperature fixability.

The polyester resin can be obtained by selecting and combining suitable components from among polyvalent carboxylic acids, polyols, hydroxycarboxylic acids, and the like, and performing synthesis by using a conventionally known method such as a transesterification method or a polycondensation method.

A polyvalent carboxylic acid is a compound containing two or more carboxy groups in one molecule. Of these, a dicarboxylic acid, which is a compound comprising two carboxy groups in one molecule, is preferably used.

Examples of the dicarboxylic acid include oxalic acid, succinic acid, glutaric acid, maleic acid, adipic acid, β-methyladipic acid, azelaic acid, sebacic acid, nonanedicarboxylic acid, decanedicarboxylic acid, undecanedicarboxylic acid, dodecanedicarboxylic acid, fumaric acid, citraconic acid, diglycolic acid, cyclohexane-3,5-diene-1,2-carboxylic acid, hexahydroterephthalic acid, malonic acid, pimelic acid, suberic acid, phthalic acid, isophthalic acid, terephthalic acid, tetrachlorophthalic acid, chlorophthalic acid, nitrophthalic acid, p-carboxyphenylacetic acid, p-phenylenediacetic acid, m-phenylenediacetic acid, o-phenylenediacetic acid, diphenylacetic acid, diphenyl-p,p'-dicarboxylic acid, naphthalene-1,4-dicarboxylic acid, naphthalene-1,5-dicarboxylic acid, naphthalene-2,6-dicarboxylic acid, anthracenedicarboxylic acid, cyclohexanedicarboxylic acid, and the like.

Examples of the polyvalent carboxylic acid other than the dicarboxylic acid include trimellitic acid, trimesic acid, pyromellitic acid, naphthalenetricarboxylic acid, naphthalenetetracarboxylic acid, pyrenetricarboxylic acid, pyrenetetracarboxylic acid, itaconic acid, glutaconic acid, n-dodecyl succinic acid, n-dodecenyl succinic acid, iododecyl succinic acid, isododecenyl succinic acid, n-octyl succinic acid, n-octenyl succinic acid, and the like. These may be used alone or in combination of two or more.

A polyol is a compound containing two or more hydroxyl groups in one molecule. Of these, a diol, which is a compound containing two hydroxyl groups in one molecule, is preferably used.

Specific examples include ethylene glycol, diethylene glycol, triethylene glycol, 1,2-propylene glycol, 1,3-propylene glycol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, 1,14-eicosanedecanediol, diethylene glycol, triethylene glycol, dipropylene glycol, polyethylene glycol, polypropylene glycol, polytetramethylene ether glycol, 1,4-cyclohexanediol, 1,4-cyclohexanedimethanol, 1,4-butenediol, neopentyl glycol, 1,4-cyclohexanediol, polytetramethylene glycol, hydrogenated bisphenol A, bisphenol A, bisphenol F, bisphenol S, alkylene oxide (ethylene oxide, propylene oxide, butylene oxide, and the like) adducts of the above bisphenols, and the like.

Of these, the preferred are alkylene glycols having 2 to 12 carbon atoms and alkylene oxide adducts of bisphenols, and particularly preferable ones are alkylene oxide adducts of bisphenols and combinations thereof with alkylene glycols having 2 to 12 carbon atoms.

Examples of trivalent or higher polyols include glycerin, trimethylolethane, trimethylolpropane, pentaerythritol, hexamethylolmelamine, hexamethylolmelamine, tetramethylolbenzoguanamine, tetraethylolbenzoguanamine, sorbitol, trisphenol PA, phenol novolac, cresol novolak, alkylene oxide adducts of the above trivalent or higher polyphenols, and the like. These may be used alone or in combination of two or more.

Examples of the styrene acrylic resin include homopolymers composed of the following polymerizable monomers, copolymers obtained by combining two or more of these, or mixtures thereof.

Styrene-based monomers such as styrene, α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, and p-phenylstyrene;

(meth)acrylic monomers such as methyl (meth)acrylate, ethyl (meth)acrylate, n-propyl (meth)acrylate, iso-propyl (meth)acrylate, n-butyl (meth)acrylate, iso-butyl (meth)acrylate, tert-butyl (meth)acrylate, n-amyl (meth)acrylate, n-hexyl (meth)acrylate, 2-ethylhexyl (meth)acrylate, n-octyl (meth)acrylate, n-nonyl (meth) acrylate, cyclohexyl (meth)acrylate, benzyl (meth) acrylate, dimethyl phosphate ethyl (meth)acrylate, diethyl phosphate ethyl (meth)acrylate, dibutyl phosphate ethyl (meth)acrylate and 2-benzoyloxyethyl (meth)acrylate, (meth)acrylonitrile, 2-hydroxyethyl (meth)acrylate, (meth)acrylic acid, and maleic acid;

vinyl ether monomers such as vinyl methyl ether and vinyl isobutyl ether;

vinyl ketone monomers such as vinyl methyl ketone, vinyl ethyl ketone, vinyl isopropenyl ketone, and the like; and polyolefins such as ethylene, propylene, butadiene, and the like.

A polyfunctional polymerizable monomer can be used, if necessary, for the styrene acrylic resin. Examples of the polyfunctional polymerizable monomer include diethylene glycol di(meth)acrylate, triethylene glycol di(meth)acrylate, tetraethylene glycol di(meth)acrylate, polyethylene glycol di(meth)acrylate, 1,6-hexanediol di(meth)acrylate, neopentyl glycol di(meth)acrylate, tripropylene glycol di(meth) acrylate, polypropylene glycol di(meth)acrylate, 2,2'-bis(4-((meth)acryloxydiethoxy)phenyl)propane, trimethylolpropane tri(meth)acrylate, tetramethylolmethane tetra(meth)acrylate, divinylbenzene, divinylnaphthalene, divinyl ether, and the like.

Further, in order to control the degree of polymerization, it is also possible to further add a known chain transfer agent and a known polymerization inhibitor.

Examples of the polymerization initiator for obtaining the styrene acrylic resin include organic peroxide-based initiators and azo-based polymerization initiators.

Examples of the organic peroxide-based initiator include benzoyl peroxide, lauroyl peroxide, di-α-cumyl peroxide, 2,5-dimethyl-2,5-bis(benzolyperoxy)hexane, bis (4-t-butylcyclohexyl)peroxydicarbonate, 1,1-bis(t-butylperoxy)cyclododecane, t-butylperoxymaleic acid, bis(t-butylperoxy) isophthalate, methyl ethyl ketone peroxide, tert-butylperoxy-2-ethylhexanoate, diisopropylperoxycarbonate, cumene hydroperoxide, 2,4-dichlorobenzoyl peroxide, tert-butyl-peroxypivalate, and the like.

Examples of the azo-based polymerization initiator include 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, azobismethylbutyronitrile, 2,2'-azobis-(methyl isobutyrate), and the like.

Further, as the polymerization initiator, a redox-based initiator in which an oxidizing substance and a reducing substance are combined can also be used. Examples of the oxidizing substance include hydrogen peroxide, an inorganic peroxide of a persulfate (sodium salt, potassium salt and ammonium salt), and an oxidizing metal salt of a tetravalent cerium salt.

Examples of the reducing substance include reducing metal salts (divalent iron salt, monovalent copper salt and trivalent chromium salt), ammonia, lower amines (amines having from 1 to 6 carbon atoms such as methylamine and ethylamine), amine compounds such as hydroxylamine, reducing sulfur compounds such as sodium thiosulfate, sodium hydrosulfite, sodium hydrogen sulfite, sodium sulfite, sodium formaldehyde sulfoxylate, lower alcohols (having 1 to 6 carbon atoms), ascorbic acid or salts thereof and lower aldehydes (having 1 to 6 carbon atoms).

The polymerization initiator is selected with reference to a 10-h half-life temperature, and is used alone or in combination. The amount of the polymerization initiator added varies depending on the desired degree of polymerization but is generally from 0.5 to 20.0 parts by mass with respect to 100.0 parts by mass of the polymerizable monomers.

Release Agent

A known wax can be used as the release agent for the toner.

Specific examples include petroleum-based waxes represented by paraffin wax, microcrystalline wax, petrolactam, and derivatives thereof, montan wax and derivatives thereof, hydrocarbon waxes obtained by a Fischer-Tropsch method and derivatives thereof, polyolefin waxes represented by polyethylene and derivatives thereof, natural waxes represented by carnauba wax and candelilla wax and derivatives thereof, the derivatives including oxides, block copolymers with vinyl monomers, and graft modified products.

Other examples include alcohols such as higher fatty alcohols, fatty acids such as stearic acid, palmitic acid, and the like or acid amides, esters and ketones thereof, hardened castor oil and derivatives thereof, vegetable waxes, and animal waxes. These can be used alone or in combination.

Among these, it is preferable to use a polyolefin, a hydrocarbon wax produced by the Fischer-Tropsch method, or a petroleum-based wax because the developing performance and transferability tend to be improved. An antioxidant may be added to these waxes within a range in which the characteristics of the toner are not affected.

Further, from the viewpoint of phase separation with respect to the binder resin or the crystallization temperature thereof, higher fatty acid esters such as behenyl behenate and dibiphenyl sebacate can be preferably exemplified.

The amount of the release agent is preferably from 1.0 to 30.0 parts by mass with respect to 100.0 parts by mass of the binder resin.

The melting point of the release agent is preferably from 30 to 120° C., and more preferably from 60 to 100° C. By using a release agent having a melting point of from 30 to 120° C., the release effect is efficiently exhibited and a wider fixing region is ensured.

Plasticizer

It is preferable to use a crystalline plasticizer for the toner of the present invention in order to improve a sharp melt property. The plasticizer is not particularly limited, and known ones suitable for toners as described below can be used.

Esters of monohydric alcohols and aliphatic carboxylic acids such as behenyl behenate, stearyl stearate, and palmityl palmitate, or esters of monovalent carboxylic acids and aliphatic alcohols; esters of dihydric alcohols and aliphatic carboxylic acids such as ethylene glycol distearate, dibehenyl sebacate, and hexanediol dibehenate, or esters of divalent carboxylic acids and aliphatic alcohols; esters of trihydric alcohols and aliphatic carboxylic acids such as glycerin tribehenate, or esters of trivalent carboxylic acids and aliphatic alcohols; esters of tetrahydric alcohols and aliphatic carboxylic acids such as pentaerythritol tetrastearate and pentaerythritol tetrapalmitate, or esters of tetravalent carboxylic acids and aliphatic alcohols; esters of hexahydric alcohols and aliphatic carboxylic acids such as dipentaerythritol hexastearate and dipentaerythritol hexapalmitate, or esters of hexavalent carboxylic acids and aliphatic alcohols; esters of polyhydric alcohols and aliphatic carboxylic acids such as polyglycerin behenate, or esters of polyvalent carboxylic acids and aliphatic alcohols; and natural ester waxes such as carnauba wax and rice wax. These can be used alone or in combination.

Colorant

The toner particle may include a colorant. Known pigments and dyes can be used as the colorant. Pigments are preferable as the colorant from the viewpoint of excellent weather resistance.

Examples of cyan-based colorants include copper phthalocyanine compounds and derivatives thereof, anthraquinone compounds, basic dye lake compounds, and the like.

Specifical examples include C. I. Pigment Blue 1, 7, 15, 15:1, 15:2, 15:3, 15:4, 60, 62, and 66.

Examples of magenta colorants include condensed azo compounds, diketopyrrolopyrrole compounds, anthraquinone compounds, quinacridone compounds, basic dye lake compounds, naphthol compounds, benzimidazolone compounds, thioindigo compounds, perylene compounds, and the like.

Specifical examples include C. I. Pigment Red 2, 3, 5, 6, 7, 23, 48:2, 48:3, 48:4, 57:1, 81:1, 122, 144, 146, 150, 166, 169, 177, 184, 185, 202, 206, 220, 221, and 254, and C. I. Pigment Violet 19.

Examples of yellow colorants include condensed azo compounds, isoindolinone compounds, anthraquinone compounds, azo metal complexes, methine compounds, and allylamide compounds.

Specific examples include C. I. Pigment Yellow 12, 13, 14, 15, 17, 62, 74, 83, 93, 94, 95, 97, 109, 110, 111, 120, 127, 128, 129, 147, 151, 154, 155, 168, 174, 175, 176, 180, 181, 185, 191, and 194.

Examples of black colorants include those colored black using the above-mentioned yellow colorant, magenta colorant and cyan colorant, and carbon black.

These colorants can be used alone or as a mixture, and they can be used in the form of a solid solution.

It is preferable to use the colorant in an amount of from 1.0 to 20.0 parts by mass with respect to 100.0 parts by mass of the binder resin.

Charge Control Agent and Charge Control Resin

The toner particle may include a charge control agent or a charge control resin.

As the charge control agent, known ones can be used, and in particular, a charge control agent having a high triboelectric charge speed and capable of stably maintaining a constant triboelectric charge quantity is preferable. Further, when the toner particles are produced by the suspension polymerization method, a charge control agent having a low polymerization inhibitory property and providing substantially no solubilized material in an aqueous medium is particularly preferable.

Example of charge control agents that that control the toner to negative-charging include monoazo metal compounds, acetylacetone metal compounds, metal compounds of aromatic hydroxycarboxylic acids, aromatic dicarboxylic acids, hydroxycarboxylic acids and dicarboxylic acids, aromatic hydroxycarboxylic acids, aromatic mono and polycarboxylic acids, and metal salts, anhydrides, and esters thereof, phenol derivatives such as bisphenol, urea derivatives, metal-containing salicylic acid-based compounds, metal-containing naphthoic acid-based compounds, boron compounds, quaternary ammonium salts, calixarene, charge control resins, and the like.

Examples of the charge control resin include polymers or copolymers having a sulfonic acid group, a sulfonic acid base, or a sulfonic acid ester group. Particularly preferable examples of the polymers having a sulfonic acid group, a sulfonic acid base, or a sulfonic acid ester group include polymers including a sulfonic acid group-containing acrylamide-based monomer or a sulfonic acid group-containing methacrylamide-based monomer in a copolymerization ratio of 2% by mass or more, and more preferably 5% by mass or more.

The charge control resin preferably has a glass transition temperature (Tg) of from 35 to 90° C., a peak molecular weight (Mp) of from 10,000 to 30,000, and a weight average molecular weight (Mw) of from 25,000 to 50,000. When such charge control resin is used, favorable triboelectric characteristics can be imparted without affecting the thermal characteristics required for the toner particle. Further, where the charge control resin comprises a sulfonic acid group, for example, the dispersibility of the charge control resin itself in the polymerizable monomer composition and the dispersibility of the colorant and the like are improved, and the tinting strength, transparency and triboelectric charging characteristics can be further improved.

These charge control agents or charge control resins may be added alone or in combination of two or more.

The amount of the charge control agent or charge control resin added is preferably from 0.01 to 20.0 parts by mass, and more preferably from 0.5 to 10.0 parts by mass with respect to 100.0 parts by mass of the binder resin.

Method for Producing Toner

A method for producing the toner is not particularly limited, and known methods such as a pulverization method, a suspension polymerization method, a dissolution suspension method, an emulsion aggregation method, and a dispersion polymerization method can be used. Here, the toner is preferably produced by the method shown below. That is, the toner is preferably produced by an emulsion aggregation method.

The toner production method includes the following steps (1) to (3) performed in the following order:

(1) a dispersion step of preparing a binder resin fine particle-dispersed solution comprising the binder resin, (2) an aggregation step of aggregating the binder resin fine particles comprised in the binder resin fine particle-dispersed solution to form an aggregate, and (3) a fusion step of heating and fusing the aggregate, and a boric acid source is added in at least one of the aggregation step and the fusion step.

Also, it is preferable that the following steps (4) to (6) be performed in the following order during or after the fusion step:

(4) a spheroidization step of heating the aggregate by further raising the temperature, (5) a cooling step of cooling the aggregate at a cooling rate of 0.1° C./sec or higher, and (6) an annealing step of heating and holding the aggregate to a temperature equal to or higher than the crystallization temperature or glass transition temperature of the binder resin.

The toner is preferably produced by the emulsion aggregation method because the shape of the toner can be controlled and boric acid is likely to be dispersed uniformly near the toner surface. The details of the emulsion aggregation method will be described below.

Emulsion Aggregation Method

With the emulsion aggregation method, an aqueous dispersion of fine particles composed of constituent materials of toner particles, which are sufficiently small as compared with the target particle diameter, is prepared in advance, these fine particles are aggregated in an aqueous medium until the particle diameter of the toner particles is reached, and the resin is fused by heating or the like to produce toner particles.

That is, in the emulsion aggregation method, toner particles are produced through a dispersion step of producing a fine particle-dispersed solution composed of constituent materials of toner particles, an aggregation step of aggregating the fine particles composed of constituent materials of toner particles to control the particle diameter until the particle diameter of the toner particles is reached, a fusion step of fusing the resin contained in the obtained aggregated particles, a spheroidization step of melting by further heating or the like to control the surface shape of the toner, a subsequent cooling step, a metal removal step of sorting the obtained toner and removing excess polyvalent metal ions, a filtering/washing step of washing with ion-exchanged water or the like, and a step of removing moisture from the washed toner particles and drying.

Step of Preparing Resin Fine Particle-Dispersed Solution (Dispersion Step)

The resin fine particle-dispersed solution can be prepared by known methods, but is not limited to these methods. Known methods include, for example, an emulsion polymerization method, a self-emulsification method, a phase inversion emulsification method in which an aqueous medium is added to a resin solution obtained by dissolving in an organic solvent to emulsify the resin, or a forced emulsification method in which a resin is forcibly emulsified by high-temperature treatment in an aqueous medium without using an organic solvent.

Specifically, the binder resin is dissolved in an organic solvent capable of dissolving the binder resin, and a surfactant or a basic compound is added. At that time, where the binder resin is a crystalline resin having a melting point, melting may be performed by heating to or above the melting point. Subsequently, an aqueous medium is slowly added while stirring with a homogenizer or the like to precipitate the resin fine particles. Then, the solvent is removed by heating or reducing the pressure to prepare an aqueous dispersion liquid of resin fine particles. As the organic solvent to be used to dissolve the resin, any organic solvent that can dissolve the resin can be used, but from the viewpoint of suppressing the generation of coarse powder, it is preferable to use an organic solvent, such as toluene, that forms a uniform phase with water.

The surfactant used at the time of emulsification is not particularly limited, and examples thereof include anionic surfactants such as sulfuric acid esters and salts, sulfonic acid salts, carboxylic acid salts, phosphoric acid esters, soaps, and the like; cationic surfactants such as amine salts, quaternary ammonium salts, and the like; and nonionic surfactants such as polyethylene glycols, alkylphenol ethylene oxide adducts, polyhydric alcohols, and the like. The surfactants may be used alone or in combination of two or more.

Examples of the basic compound that is used in the dispersion step include inorganic bases such as sodium hydroxide, potassium hydroxide, and the like, and organic bases such as ammonia, triethylamine, trimethylamine, dimethylaminoethanol, diethylaminoethanol, and the like. The basic compounds may be used alone or in combination of two or more.

Further, the 50% particle diameter (D50) of the fine particles of the binder resin in the aqueous dispersion liquid of the resin fine particles which is based on the volume distribution is preferably from 0.05 to 1.0 m, and more preferably from 0.05 to 0.4 μm. By adjusting the 50% particle diameter (D50) based on the volume distribution to the above range, it becomes easy to obtain toner particles having a volume average particle diameter of from 3 to 10 m which is appropriate for toner particles.

A dynamic light scattering type particle size distribution meter NANOTRACK UPA-EX150 (manufactured by Nikkiso Co., Ltd.) is used to measure the 50% particle diameter (D50) based on the volume distribution.

Colorant Fine Particle-Dispersed Solution

If necessary, a colorant fine particle-dispersed solution may be used. The colorant fine particle-dispersed solution can be prepared by the following known methods but is not limited to these methods. Thus, the colorant fine particle-dispersed solution can be prepared by mixing a colorant, an aqueous medium, and a dispersing agent with a mixer such as a known stirrer, emulsifier, and disperser. As the dispersing agent to be used here, known substances such as a surfactant and a polymer dispersing agent can be used.

The dispersing agent, whether a surfactant or a polymer dispersing agent, can be removed in the washing step described hereinbelow, but the surfactant is preferable from the viewpoint of washing efficiency.

Examples of the surfactant include anionic surfactants such as sulfuric acid esters and salts, sulfonic acid salts, phosphoric acid esters, soaps, and the like, cationic surfactants such as amine salts and quaternary ammonium salts, and nonionic surfactants such as polyethylene glycols, alkylphenol ethylene oxide adducts, and polyhydric alcohols. Among these, nonionic surfactants or anionic surfactants are preferable. Further, a nonionic surfactant and an anionic surfactant may be used in combination. The surfactants may be used alone or in combination of two or more. The concentration of the surfactant in the aqueous medium is preferably from 0.5 to 5% by mass.

The amount of the colorant fine particles in the colorant fine particle-dispersed solution is not particularly limited but is preferably from 1 to 30% by mass with respect to the total mass of the colorant fine particle-dispersed solution.

Further, as for the dispersed particle diameter of the colorant fine particles in the aqueous dispersion liquid of the colorant, from the viewpoint of the dispersibility of the colorant in the finally obtained toner, the 50% particle diameter (D50) based on the volume distribution is preferably 0.5 m or less. Further, for the same reason, it is preferable that the 90% particle diameter (D90) based on the volume distribution be 2 m or less. The dispersed particle diameter of the colorant fine particles dispersed in the aqueous medium is measured by a dynamic light scattering type particle size distribution meter (NANOTRACK UPA-EX150: manufactured by Nikkiso Co., Ltd.).

Examples of mixers such as known stirrers, emulsifiers, and dispersers used to disperse colorants in aqueous media include ultrasonic homogenizers, jet mills, pressure homogenizers, colloid mills, ball mills, sand mills, and paint shakers. These may be used alone or in combination.

Release Agent (Aliphatic Hydrocarbon Compound) Fine Particle-Dispersed Solution

If necessary, a release agent fine particle dispersed-solution may be used. The release agent fine particle dispersed-solution can be prepared by the following known methods but is not limited to these methods.

The release agent fine particle dispersed-solution can be produced by adding a release agent to an aqueous medium including a surfactant, heating to or above the melting point of the release agent and dispersing in particles with a homogenizer having a strong shearing ability (for example, "CLEARMIX W MOTION" manufactured by M Technique Co., Ltd.) or a pressure discharge type disperser (for example, "Gaulin Homogenizer" manufactured by Gaulin Co., Ltd.) and then cooling to a temperature below the melting point of the release agent.

The dispersed particle diameter of the release agent fine particle dispersed-solution in the aqueous dispersion liquid of the release agent is preferably from 0.03 to 1.0 μm, and more preferably from 0.1 to 0.5 μm in the 50% particle diameter (D50) based on the volume distribution. Further, it is preferable that there be no coarse particles of 1 μm or more.

When the dispersed particle diameter of the release agent fine particle dispersed-solution is within the above range, the release agent can be present in the toner in a finely dispersed state, the out-migration effect at the time of fixing is maximized, and good releasability can be obtained. The dispersed particle diameter of the release agent fine particle dispersed-solution obtained by dispersing in the aqueous medium can be measured with a dynamic light scattering type particle size distribution meter (NANOTRACK UPA-EX150: manufactured by Nikkiso Co., Ltd.).

Mixing Step

In the mixing step, a mixed solution in which the resin fine particle-dispersed solution and, if necessary, at least one of the release agent fine particle dispersed-solution and the colorant fine particle dispersed-solution are mixed is prepared. This can be done using a known mixing device such as a homogenizer and a mixer.

Step of Forming Aggregate Particles (Aggregation Step)

In the aggregation step, the fine particles contained in the mixed solution prepared in the mixing step are aggregated to form an aggregate having a target particle diameter. At this time, by adding and mixing a flocculant and adding, as appropriate, at least one of heating and mechanical power as necessary, an aggregate is formed in which the resin fine particles and, if necessary, at least one of the release agent fine particles and the colorant fine particles are aggregated.

Examples of the flocculant include organic flocculants such as quaternary-salt cationic surfactants, polyethyleneimine, and the like; an inorganic metal salts such as sodium sulfate, sodium nitrate, sodium chloride, calcium chloride, calcium nitrate, and the like; inorganic ammonium salts such as ammonium sulfate, ammonium chloride, ammonium nitrate, and the like; and inorganic flocculants such as divalent or higher metal complexes and the like. Further, it is also possible to add an acid so as to lower the pH and cause soft aggregation, and for example, sulfuric acid, nitric acid or the like can be used.

The flocculant may be added in the form of a dry powder or as an aqueous solution obtained by dissolving in an aqueous medium, but it is preferable to add the flocculant in the form of an aqueous solution in order to cause uniform aggregation. Further, it is preferable that the flocculant be added and mixed at a temperature equal to or lower than the glass transition temperature or the melting point of the resin contained in the mixed solution. By mixing under these temperature conditions, aggregation proceeds relatively uniformly. Mixing of the flocculant into the mixed solution can be performed using a known mixing device such as a homogenizer and a mixer. The aggregation step is a step of forming a toner particle-sized aggregate in an aqueous medium. The volume average particle diameter of the aggregates produced in the aggregation step is preferably from 3 to 10 m. The volume average particle diameter can be measured by a particle size distribution analyzer (Coulter Multisizer III: manufactured by Beckman Coulter, Inc.) by the Coulter method.

Step of Obtaining Dispersion Liquid Including Toner Particles (Fusion Step)

In the fusion step, the aggregation in the dispersion liquid comprising the aggregates obtained in the aggregation step is first stopped under the same stirring as in the aggregation step. The aggregation is stopped by adding an aggregation terminator such as a base or a chelate compound capable of adjusting pH, or an inorganic salt compound such as sodium chloride or the like.

After the dispersed state of the aggregated particles in the dispersion liquid is stabilized by the action of the aggregation terminator, heating is performed to or above the glass transition temperature or the melting point of the binder resin to fuse the aggregated particles and adjust the particle diameter to a desired value. The volume-based 50% particle diameter (D50) of the toner particles is preferably from 3 to 10 m.

Step of Obtaining Desired Surface Shape of Toner (Spheroidization Step)

It is preferable to go through a spheroidization step in which the temperature is further raised and held until the toner particles have a desired circularity or surface shape during or after the fusion step. The temperature of the specific spheroidization step is, for example, 90° C. or higher, preferably 92° C. or higher, and more preferably 95° C. or lower. Examples of the heating time in the spheroidization step include a heating time of 3 h or more, 5 h or more, and 8 h or more. By this step, hydrogen bonds derived from boric acid are likely to be formed in the toner particle.

Cooling Step

After the spheroidization step, it is preferable to go through a cooling step of controlling the cooling rate to reduce the temperature of the dispersion liquid comprising the obtained toner particles to a temperature lower than the crystallization temperature or glass transition temperature of the binder resin. By going through the cooling step, the formation of irregularities on the toner particle surface due to volume changes such as expansion or contraction of the materials in the toner particle is suppressed, so that it becomes easy to control the shape factor SF1 of the cross section to from 105 to 125, or control the contact area ratio (D/S) of the toner to 14% or less. Further, by increasing the cooling rate, the volume changes can be further suppressed, so that the generation of dents on the toner particle surface can be suppressed, the desired circularity or surface shape obtained in the spheroidization step can be maintained, the shape factor SF1 and the shape factor SF1 of the cross section of the toner can be set to 125 or less, and the contact area ratio (D/S) of the toner can be set to 14% or less. The specific cooling rate is 0.1° C./sec or higher, preferably 0.5° C./sec or higher, more preferably 2° C./sec or higher, and still more preferably 4° C./sec or higher.

Annealing Step

After the cooling step, it is preferable to go through an annealing step of heating and holding at a temperature equal to or higher than the crystallization temperature or glass transition temperature of the binder resin, and when the release agent is contained, a temperature equal to or lower than the crystallization temperature of the release agent. By going through the annealing step, the volume changes can be further suppressed, so that the generation of dents on the toner particle surface can be suppressed. Therefore, the desired circularity or surface shape obtained through the cooling step can be maintained, the shape factor SF1 and the shape factor SF1 of the cross section of the toner can be set to 125 or less, and the contact area ratio (D/S) of the toner can be controlled to 14% or less. The specific annealing temperature is from 45 to 75° C., preferably from 50 to 70° C., and more preferably from 55 to 65° C. The heat treatment time in the annealing step is, for example, 5 h or less, preferably from 2 to 3 h.

Post-Treatment Step

In the toner production method, a post-treatment step such as a washing step, a solid-liquid separation step, and a drying step may be further performed, and by performing the post-treatment step, toner particles in a dried state can be obtained.

External Addition Step

The obtained toner particles may be used as they are as a toner.

In the external addition step, inorganic fine particles are externally added, if necessary, to the toner particles obtained in the drying step. Specifically, it is preferable that inorganic fine particles such as silica or the like, or resin fine particles such as vinyl resin, polyester resin, and silicone resin be added and mixed by applying a shearing force in a dry state. Silica fine particles are mixed preferably in an amount from 1.2 to 1.8 parts by mass with respect to 100 parts by mass of toner particles for a time of from 2 to 16 min, and more preferably in an amount from 1.3 to 1.7 parts by mass for a time of from 6 to 10 min. When silica fine particles are added and mixed in the addition amount and for the mixing time within the above ranges, the coverage of the toner particle surface by the silica fine particles measured by the X-ray photoelectron spectrometer is likely to be controlled to the range of from 50 to 80% by area and the dispersity evaluation index of silica fine particles on the toner surface is likely to be controlled to the range of from 0.10 to 2.00.

The toner production method preferably has a shell forming step of forming aggregated particles (core particles) by the aggregation step and then further adding resin fine particles comprising a resin for a shell to cause aggregation and form a shell. That is, it is preferable that the toner particle has a core particle comprising a binder resin and a shell on the core particle surface. As the resin for the shell, the same resin as the binder resin may be used, or another resin may be used. The amount of the resin added for the shell is preferably from 1 to 10 parts by mass, and more preferably from 2 to 7 parts by mass with respect to 100 parts by mass of the binder resin contained in the core particle.

In this case, it is preferable that the toner production method has the following steps:

(1) a dispersion step of preparing a binder resin fine particle-dispersed solution comprising a binder resin, (2-1) an aggregation step of aggregating the binder resin fine particles comprised in the binder resin fine particle-dispersed solution to form an aggregate, (2-2) a shell forming step to form an aggregate having a shell by further adding resin fine particles comprising a resin for a shell to the binder resin fine particle-dispersed solution comprising the aggregate, and aggregating the resin fine particles comprising a resin for a shell, and (3) a fusion step of heating and fusing the aggregate.

That is, the above-mentioned aggregation step (2) (aggregation step of aggregating the binder resin fine particles comprised in the binder resin fine particle-dispersed solution to form an aggregate) preferably includes the following steps (2-1) and (2-2).

(2-1) An aggregation step of aggregating the binder resin fine particles comprised in the binder resin fine particle-dispersed solution to form an aggregate, and (2-2) a shell forming step to form an aggregate having a shell by further adding resin fine particles comprising a resin for a shell to the binder resin fine particle-dispersed solution comprising the aggregate, and aggregating the resin fine particles comprising a resin for a shell.

Further, it is more preferable that the following steps (4) to (6) be performed in the following order during or after the fusion step:

(4) a spheroidization step of heating the aggregate by further raising the temperature, (5) a cooling step of cooling the aggregate at a cooling rate of 0.1° C./sec or higher, and (6) an annealing step of heating and holding the aggregate at a temperature equal to or higher than the crystallization temperature or glass transition temperature of the binder resin.

In order to facilitate the inclusion of boric acid in the vicinity of the toner particle surface, it is preferable to add a boric acid source together with the resin fine particles comprising the resin for the shell to the dispersion liquid comprising the aggregate in the shell forming step.

The boric acid source may be boric acid or a compound that can be changed to boric acid by pH control or the like during toner production. For example, at least one selected from the group consisting of boric acid, borax, organic boric acid, boric acid salts, boric acid esters, and the like can be mentioned. For example, a boric acid source may be added and control may be performed to comprise boric acid in the aggregate. Preferably, the pH is controlled to acidic conditions in the aggregation step, and the shell forming step is carried out thereafter.

Boric acid may be present in the aggregate in an unsubstituted state. The boric acid source is preferably at least one selected from the group consisting of boric acid and borax. When the toner is produced in an aqueous medium, it is preferable to add a boric acid salt as a boric acid source from the viewpoint of reactivity and production stability. Specifically, the boric acid source more preferably comprises at least one selected from the group consisting of sodium tetraborate, borax, ammonium borate, and the like, and more preferably borax.

Borax is represented by the decahydrate of sodium tetraborate $Na_2B_4O_7$ and changes to boric acid in an acidic aqueous solution. Therefore, borax is preferably used when using in an acidic environment in an aqueous medium. As a method of addition, either a dry powder or an aqueous solution obtained by dissolving in an aqueous medium may be added, but in order to induce uniform aggregation, it is preferable to add in the form of an aqueous solution. The concentration of the aqueous solution may be changed, as appropriate, according to the concentration in the toner, and is, for example, from 1 to 20% by mass. In order to change to boric acid, it is preferable to set the pH to acidic conditions before, during or after the addition. For example, control may be performed to 1.5 to 5.0, and preferably to 2.0 to 4.0.

Next, methods for measuring each physical property according to the present disclosure will be described.

Measurement of Weight Average Particle Diameter (D4) and Number Average Particle Diameter (D1) of Toner or Toner Particles The weight-average particle diameter (D4) and the number-average particle diameter (D1) of the toner or toner particles are calculated in the manner described below. A precision particle size distribution measuring apparatus based on a pore electric resistance method with a 100 μm aperture tube (a Coulter Counter Multisizer 3 (registered trademark) produced by Beckman Coulter, Inc.) and dedicated software for the measurement apparatus (Beckman Coulter Multisizer 3 Version 3.51 produced by Beckman Coulter, Inc.) for setting measurement conditions and analysis of measured data are used for measurement. The measurements are carried out using 25,000 effective measurement channels, and then measurement data is analyzed and calculated.

A solution obtained by dissolving special grade sodium chloride in ion exchanged water at a concentration of approximately 1 mass %, such as “ISOTON II” (produced by Beckman Coulter), can be used as an aqueous electrolyte solution used in the measurements.

The dedicated software was set up in the following way before carrying out measurements and analysis. On the “Standard Operating Method (SOM) alteration” screen in the dedicated software, the total count number in control mode is set to 50,000 particles, the number of measurements is set to 1, and the Kd value is set to the value obtained by using “standard particle 10.0 μm” (Beckman Coulter). By pressing the “Threshold value/noise level measurement button”, threshold values and noise levels are automatically set. In addition, the current is set to 1600 μA, the gain is set to 2, the electrolyte solution is set to ISOTON II, and the “Flush aperture tube after measurement” option is checked. On the “Conversion settings from pulse to particle diameter” screen in the dedicated software, the bin interval is set to logarithmic particle diameter, the particle diameter bin is set to 256 particle diameter bin, and the particle diameter range is set to from 2 to 60 m.

The specific measurement method is as follows.

1. 200 mL of the aqueous electrolyte solution is placed in a dedicated Multisizer 3 250 mL glass round bottomed beaker, the beaker is set on a sample stand, and a stirring rod is rotated anticlockwise at a rate of 24 rotations/second. By carrying out the “Aperture tube flush” function of the dedicated software, dirt and bubbles in the aperture tube are removed.
2. Approximately 30 mL of the aqueous electrolyte solution is placed in a 100 mL glass flat bottomed beaker. Approximately 0.3 mL of a diluted liquid, which is obtained by diluting “Contaminon N” (a 10 mass % aqueous solution of a neutral detergent for cleaning precision measurement equipment, which has a pH of 7 and comprises a non-ionic surfactant, an anionic surfactant and an organic builder, available from Wako Pure Chemical Industries, Ltd.) approximately 3-fold in terms of mass with ion exchanged water, is added to the beaker as a dispersant.

3. An ultrasonic wave disperser (Ultrasonic Dispersion System Tetra 150 produced by Nikkaki Bios Co., Ltd.) having an electrical output of 120 W, in which two oscillators having an oscillation frequency of 50 kHz are housed so that their phases are staggered by 1800 is prepared. A predetermined amount of ion exchanged water is placed in a water bath in the ultrasonic dispersion system, and approximately 2 mL of Contaminon N is added to this water bath.
4. The beaker mentioned in step (2) above is placed in a beaker-fixing hole in the ultrasonic wave disperser, and the ultrasonic wave disperser is activated. The height of the beaker is adjusted so that the resonant state of the liquid surface of the aqueous electrolyte solution in the beaker is at a maximum.
5. While the aqueous electrolyte solution in the beaker mentioned in section (4) above is being irradiated with ultrasonic waves, approximately 10 mg of toner is added a little at a time to the aqueous electrolyte solution and dispersed therein. The ultrasonic wave dispersion treatment is continued for a further 60 seconds. When carrying out the ultrasonic wave dispersion, the temperature of the water bath is adjusted as appropriate to a temperature of from 10° C. to 40° C.
6. The aqueous electrolyte solution mentioned in section (5) above, in which the toner is dispersed, is added dropwise by means of a pipette to the round bottomed beaker mentioned in section (1) above, which is disposed on the sample stand, and the measurement concentration is adjusted to approximately 5%. Measurements are carried out until the number of particles measured reaches 50,000.
7. The weight-average particle diameter (D4) and the number-average particle diameter (D1) are calculated by analyzing measurement data using the accompanying dedicated software. The "AVERAGE DIAMETER" on the "ANALYSIS/VOLUME STATISTICAL VALUE (ARITHMETIC MEAN)" screen when the special software is set to graph/volume % is the weight average particle diameter (D4). The "AVERAGE DIAMETER" on the "ANALYSIS/NUMBER STATISTICAL VALUE (ARITHMETIC MEAN)" screen when the special software is set to graph/number % is the number average particle diameter (D1).

Method for Measuring Average Circularity of Toner

The average circularity of the toner is measured with an "FPIA-3000" flow particle image analyzer (Sysmex Corporation) under the measurement and analysis conditions for calibration operations.

After adding an appropriate amount of a surfactant (alkylbenzene sulfonate) as a dispersing agent to 20 mL of ion-exchanged water, 0.02 g of a measurement sample is added, and dispersion treatment is performed for 2 min by using a desktop ultrasonic cleaner disperser with an oscillation frequency of 50 kHz and an electrical output of 150 Watts (trade name: VS-150, manufactured by Velvo-Clear Co., Ltd.) to prepare a dispersion liquid for measurement. At that time, cooling is performed, as appropriate, so that the temperature of the dispersion liquid becomes from 10 to 40° C.

The flow type particle image analyzer equipped with a standard objective lens (10×) is used for measurement, and the particle sheath "PSE-900A" (manufactured by Sysmex Corporation) is used as a sheath liquid. The dispersion liquid prepared according to the above procedure is introduced into the flow type particle image analyzer, 3000 toner particles are measured in a total count mode in an HPF measurement mode, a binarization threshold value at the time of particle analysis is set to 85%, the diameter of the analyzed particle is limited to a circle-equivalent diameter of from 1.98 to 19.92 μm, and the average circularity of the toner (particles) is obtained.

In the measurement, automatic focus adjustment is performed using standard latex particles (for example, 5100A (trade name) manufactured by Duke Scientific Corporation) diluted with ion-exchanged water) before the start of measurement. After that, it is preferable to perform focus adjustment every 2 h from the start of measurement.

Method for Measuring Toner Shape Factor SF1

The toner is observed using an FE-SEM (trade name: S-4700, manufactured by Hitachi, Ltd.) at an observation magnification set to 2000 times.

The toner image is analyzed using image analysis software (trade name: analySIS Pro) manufactured by Olympus Corporation. The absolute maximum length R, peripheral length L, and cross-sectional area S of the toner are obtained. From the obtained peripheral length of the toner, the circle-equivalent diameter r is obtained by the circle-equivalent diameter $r=L/\pi$, and an object for which this value is within a range of ±10% of the weight average particle diameter D4 obtained by the aforementioned method using a Coulter counter is taken as a corresponding particle.

A total of 50 of the corresponding particles are randomly selected, the average of the absolute maximum lengths of the cross sections thereof is taken as Rave, the average of the cross section areas is taken as Save, and the value of the toner shape factor SF1 (cross section) is obtained from the following formula.

$$\text{Shape factor SF1}=(\text{Rave}^2\times\pi)/(\text{Save}\times 4)\times 100$$

Method for Measuring Shape Factor SF1 of Toner Cross Section

A cross section polisher (trade name: SM-09010) manufactured by JEOL Ltd. is used to measure the shape factor of the toner by the CP cross-section method. Then, a cross section of the toner is prepared as described hereinbelow.

A carbon double-sided pressure-sensitive adhesive sheet section is pasted on a silicon wafer, a Mo mesh (diameter: 3 mm/thickness: 30 μm) is fixed, and about one layer of toner (thickness of about one toner particle) is attached thereonto. After vapor-depositing platinum thereon, a cross section of the toner is formed using a cross section polisher under the conditions of an acceleration voltage of 4 kV and a processing time of 3 h.

The toner cross section thus formed is observed using the FE-SEM (trade name: S-4700; manufactured by Hitachi, Ltd.) at an observation magnification set to 2000 times.

The image of the toner cross section is analyzed using image analysis software (trade name: analySIS Pro) manufactured by Olympus Corporation. The absolute maximum length R, peripheral length L, and cross-sectional area S of the toner cross section are obtained. From the obtained peripheral length of the toner, the circle-equivalent diameter r is obtained by the circle-equivalent diameter $r=L/\pi$, and an object for which this value is within a range of ±10% of the weight average particle diameter D4 obtained by the aforementioned method using a Coulter counter is taken as a corresponding particle.

A total of 50 of the corresponding particles are randomly selected, the average of the absolute maximum lengths of the cross sections thereof is taken as Rave, the average of the cross section areas is taken as Save, and the value of the toner shape factor SF1 of the cross section is obtained from the following formula.

$$\text{Shape factor SF1 of the cross section}=(\text{Rave}^2\times\pi)/(\text{Save}\times 4)\times 100$$

Method for Measuring Toner Contact Area Ratio (D/S)

A colorless and transparent slide glass (thickness about 2 mm) is prepared, and a 22-μm-opening is prepared thereon. The toner is laid on the mesh, and a small amount of the toner is uniformly laid on the slide glass by sieving from a height of 10 cm by applying vibrations for 10 sec. Subsequently, the magnification is increased to 100 times in a laser microscope (KH-3000, manufactured by HIROX Co., Ltd.), a toner image is captured from the slide glass side, and the toner image is taken into an image analysis device. Image analysis is performed by randomly sampling 50 particles on the image taken in analysis software (Image-Pro Plus 4.5, manufactured by Media Cybernetics, Inc.). In the image analysis, assuming that the area of the region where the toner and the glass surface are in contact is D and the projected area of the entire toner is S, D/S is the value of the contact area ratio of the toner.

IR Analysis of Toner (Particles) by ATR Method Using Germanium (Ge) as ATR Crystal (ATR Crystal)

ATR-IR analysis using the toner is performed by the following method. The toner particles obtained by removing the external additive from the toner by the method described hereinbelow can also be used as a sample.

IR analysis is performed by the ATR method using a Fourier transform infrared spectroscopic analyzer (Spectrum One: manufactured by PerkinElmer Co.) equipped with a universal ATR measurement accessory (Universal ATR Sampling Accessory). The specific measurement procedure is as follows.

The incident angle of infrared light (λ=5 m) is set to 45°. As the ATR crystal, a Ge ATR crystal (refractive index=4.0) is used. Other conditions are as follows.

Range

Start: 4000 $cm^{-1}$

End: 650 $cm^{-1}$ (Ge ATR crystal)

Duration

Scan number: 16

Resolution: 4.00 $cm^{-1}$

Advanced: with $CO_2/H_2O$ correction (1) A Ge ATR crystal (refractive index=4.0) is attached to the apparatus.

(2) Scan type is set to Background, Units are set to EGY, and the background is measured.

(3) Scan type is set to Sample, and Units are set to A.

(4) A total of 0.01 g of toner or toner particles is weighed on the ATR crystal.

(5) The sample is pressurized with a pressure arm (Force Gauge is 90).

(6) The sample is measured.

The absorption spectrum of 1380 $cm^{-1}$ is checked. When an absorption peak is detected in the vicinity of 1380 $cm^{-1}$, it is determined that a peak corresponding to boric acid has been detected.

Measurement of Boron Intensity in Fluorescent X-Ray Measurement of Toner Particles The intensity of boron in the fluorescent X-ray measurement of toner particles is measured by a calibration curve method. Specifically, an aluminum ring (inner diameter 40 mm, outer diameter 43 mm, height 5 mm) is set on a sample molding die of a semi-automatic MiniPress machine (manufactured by Specac Limited). Approximately 3 g of toner particles is placed therein and pressure-molded at a press pressure of 15 t for 1 min to prepare a pellet for measurement. A pellet molded to a thickness of about 3 mm and a diameter of about 40 mm is used.

The measurement is performed under the following conditions by using a wavelength dispersive fluorescent X-ray analyzer "Axios" (manufactured by PANalytical Co.) and the dedicated software "SuperQ ver. 4.0F" (manufactured by PANalytical Co.) that is provided therewith for setting measurement conditions and analyzing measurement data. Rh is used as the anode of an X-ray tube, the measurement atmosphere is vacuum, the measurement diameter (collimator mask diameter) is 27 mm, and the measurement time is 10 sec. In the case of boron, the detection is performed with a proportional counter (PC).

Measurement is performed under the above conditions, boron is identified based on the obtained peak position of X-rays, and the count rate (units: cps), which is the number of X-ray photons per unit time, is measured.

Method for Obtaining Toner Particles by Removing External Additive from Toner

A total of 160 g of sucrose (manufactured by Kishida Chemical Co., Ltd.) is added to 100 mL of ion-exchanged water and dissolved in a water bath to prepare a sucrose concentrate. A total of 31 g of the sucrose concentrate and 6 mL of Contaminone N (10% by mass aqueous solution of a neutral detergent for cleaning precision measuring instruments that is composed of a nonionic surfactant, an anionic surfactant, and an organic builder and has pH 7, manufactured by Wako Pure Chemical Industries, Ltd.) are placed in a centrifuge tube (50 ml capacity) to prepare a dispersion liquid. To this dispersion liquid, 1.0 g of toner is added, and toner lumps are loosened with a spatula or the like. A centrifuge tube is shaken with a shaker (AS-1N, sold by AS ONE Corporation) at 300 spm (strokes per min) for 20 min. After shaking, the solution is transferred to a glass tube (50 mL) for a swing rotor, and separation is performed by a centrifuge (H-9R, manufactured by Kokusan Co., Ltd.) at 3500 rpm for 30 min.

By this operation, the toner particles and the external additive are separated. Sufficient separation of the toner particles and the aqueous solution is visually confirmed, and the toner particles separated in the uppermost layer are collected with a spatula or the like. The collected toner particles are filtered with a vacuum filter and then dried with a dryer for 1 h or more to obtain a sample for measurement. This operation is performed multiple times to secure the required amount.

Method for Measuring Surface Coverage of Toner Particle with Silica Fine Particles The coverage of the toner particle surface with silica fine particles is determined by the following method. First, the atomic weight of silicon (hereinafter abbreviated as Si) derived from silica fine particles present on the toner particle surface is measured by ESCA (X-ray photoelectron spectroscopy).

The ESCA equipment and measurement conditions are as follows.

Device used: Quantum 2000 manufactured by ULVAC-PHI, Inc.

Analysis method: Narrow analysis

Measurement Conditions:

X-ray source: Al-Kα

X-ray conditions: beam diameter 100 μm, 25 W, 15 kV

Photoelectron uptake angle: 450

PassEnergy: 58.70 eV

Measurement range: φ100 μm

In the analysis method, first, a peak derived from the C—C bond of the carbon is orbital is corrected to 285 eV. Then, the ratio "A (atomic %)" of Si derived from silica in the total amount of constituent elements in the toner is calculated by using the relative sensitivity factor provided by ULVAC-PHI, Inc. from the peak area derived from the silicon 2p orbital where the peak top is detected at from 100 to 105 eV.

Next, the amount of Si is measured with respect to the simple substance of silica used in the toner by the same method as described above, and the ratio "B (atomic %)" of Si derived from silica in the total amount of constituent elements in the simple substance of silica is obtained. This ratio B (atomic %) is regarded as a value of 100% coverage.

At this time, the silica coverage is calculated by $$\text{Silica coverage (\%)} = \text{ratio } A/\text{ratio } B \times 100$$

When two types of external additives, the first external additive and the second external additive, are used, where both the first external additive and the second external additive are silica, the measurement is carried out by the above method because the amount of Si in the external additive simple substance is the same for both the first and second external additives.

Meanwhile, when a substance other than silica is used as the first external additive, the measurement is carried out by the following method because the amount of Si in the external additive simple substance differs between the first and second external additives.

The ratio $A_1$ of Si in the toner externally added with only the first external additive is measured, and similarly, the ratio $A_2$ of Si in the toner externally added with only the second external additive is measured. The silica coverage in this case is calculated by the following formula using the above-mentioned ratio "B (atomic %)" of Si.

$$\text{Silica coverage (\%)} = (\text{ratio } A_1/\text{ratio } B + \text{ratio } A_2/\text{ratio } B) \times 100$$

Dispersity Evaluation Index of Silica Fine Particles on Toner Surface

The dispersity evaluation index of silica fine particles on the toner surface is calculated using a scanning electron microscope "S-4800". In a field of view magnified 10,000 times, the toner with silica fine particles externally added thereto is observed in the same field of view at an acceleration voltage of 1.0 kV. The calculation is performed in the following manner from the observed image by using image processing software "ImageJ" (available from https://imagej.nih.gov/ij/).

Binarization is performed so that only silica fine particles are extracted. Specifically, energy dispersive X-ray spectroscopy (EDX) analysis on the toner surface in the same field of view is performed to determine whether the particles are silica fine particles. The number n of silica fine particles and the coordinates of the center of gravity for all the silica fine particles are calculated, and the distance dn min from a silica fine particle nearest to each silica fine particle is calculated.

Assuming that the average value of the closest distances between the silica fine particles in the image is d ave, the degree of dispersion is expressed by the following formula.

$$\text{Dispersity evaluation index} = \sqrt{\frac{\sum_1^n (dn\min - d\,ave)^2}{n}} \Big/ d\,ave$$

The dispersity of 50 toner particles observed at random is obtained by the above procedure, and the average value thereof is used as the dispersity evaluation index. The smaller the dispersity evaluation index, the better the dispersibility.

EXAMPLES

Hereinafter, the present invention will be described in more detail by way of Examples. The present invention is not limited by the following Examples. "Part" in the formulation in the text is based on mass unless otherwise specified.

Production Example of Toner 1

Preparation of Silica Fine Particles 1

A total of 10.0 parts of polydimethylsiloxane (viscosity=100 mm$^2$/s) was sprayed on 100 parts of fumed silica (trade name; AEROSIL380S, specific surface area by BET method 380 m$^2$/g, number average particle diameter of primary particles 7 nm, manufactured by Nippon Aerosil Co., Ltd.) and stirring was continued for 30 min. Then, the temperature was raised to 300° C. while stirring, and further stirring was performed for 2 h to prepare silica fine particles 1.

Synthesis of Polyester Resin 1

Bisphenol A ethylene oxide 2 mol adduct: 9 mol parts
Bisphenol A propylene oxide 2 mol adduct: 95 mol parts
Terephthalic acid: 50 mol parts
Fumaric acid: 30 mol parts
Dodecenyl succinic acid: 25 mol parts The above monomers were put in a flask equipped with a stirrer, a nitrogen introduction tube, a temperature sensor, and a rectification column, the temperature was raised to 195° C. over 1 h, and it was confirmed that the inside of the reaction system was uniformly stirred. A total of 1.0 part of tin distearate was added to 100 parts of these monomers. Further, the temperature was raised from 195° C. to 250° C. over 5 h while distilling off the generated water, and a dehydration condensation reaction was carried out at 250° C. for another 2 h.

As a result, a polyester resin 1 having a glass transition temperature of 60.2° C., an acid value of 16.8 mg KOH/g, a hydroxyl value of 28.2 mg KOH/g, a weight average molecular weight of 11,200, and a number average molecular weight of 4100 was obtained.

Synthesis of Polyester Resin 2

Bisphenol A ethylene oxide 2 mol adduct: 48 mol parts
Bisphenol A propylene oxide 2 mol adduct: 48 mol parts
Terephthalic acid: 65 mol parts
Dodecenyl succinic acid: 30 mol parts The above monomers were put into a flask equipped with a stirrer, a nitrogen introduction tube, a temperature sensor, and a rectification column, the temperature was raised to 195° C. over 1 h, and it was confirmed that the inside of the reaction system was uniformly stirred. A total of 0.7 part of tin distearate was added to 100 parts of these monomers. Further, the temperature was raised from 195° C. to 240° C. over 5 h while distilling off the generated water, and a dehydration condensation reaction was carried out at 240° C. for another 2 h. Then, the temperature was lowered to 190° C., 5 mol parts of trimellitic anhydride was gradually added, and the reaction was continued at 190° C. for 1 h.

As a result, a polyester resin 2 having a glass transition temperature of 55.2° C., an acid value of 14.3 mg KOH/g, a hydroxyl value of 24.1 mg KOH/g, a weight average molecular weight of 43,600, and a number average molecular weight of 6200 was obtained.

Preparation of Resin Particle-Dispersed Solution 1

Polyester resin 1:100 parts

Methyl ethyl ketone: 50 parts

Isopropyl alcohol 20: parts

The above methyl ethyl ketone and isopropyl alcohol were put into a container. Then, the polyester resin 1 was gradually added, stirred, and completely dissolved to obtain a polyester resin 1 solution. The container containing the polyester resin 1 solution was set at 65° C., a 10% aqueous ammonia solution was gradually added dropwise to a total of 5 parts while stirring, and 230 parts of ion-exchanged water was gradually added dropwise at a rate of 10 ml/min to induce phase inversion emulsification. Further, the solvent was removed by reducing the pressure with an evaporator to obtain a resin particle-dispersed solution 1 of the polyester resin 1. The volume average particle diameter of the resin particles was 135 nm. The resin particle solid fraction amount was adjusted to 20% with ion-exchanged water.

Preparation of Resin Particle-Dispersed Solution 2

Polyester resin 2:100 parts

Methyl ethyl ketone: 50 parts

Isopropyl alcohol: 20 parts

The above methyl ethyl ketone and isopropyl alcohol were put into a container. Then, the polyester resin 2 was gradually added, stirred, and completely dissolved to obtain a polyester resin 2 solution. The container containing the polyester resin 2 solution was set at 40° C., a 10% aqueous ammonia solution was gradually added dropwise to a total of 3.5 parts while stirring, and 230 parts of ion-exchanged water was gradually added dropwise at a rate of 10 ml/min to induce phase inversion emulsification. Further, the solvent was removed by reducing the pressure to obtain a resin particle-dispersed solution 2 of the polyester resin 2. The volume average particle diameter of the resin particles was 155 nm. The resin particle solid fraction amount was adjusted to 20% with ion-exchanged water.

Preparation of Colorant Particle-Dispersed Solution

Copper phthalocyanine (Pigment Blue 15:3): 45 parts

Ionic surfactant Neogen RK (manufactured by DKS Co., Ltd.): 5 parts

Ion-exchanged water: 190 parts

The above components were mixed and dispersed for 10 min with a homogenizer (ULTRA-TURRAX manufactured by IKA), and then dispersed for 20 min at a pressure of 250 MPa using an ULTIMIZER (counter-collision wet pulverizer: manufactured by Sugino Machine Limited) to obtain a colorant particle-dispersed solution having a volume average particle diameter of 120 nm and a solid fraction amount of 20%.

Preparation of Release Agent Particle-Dispersed Solution

Release agent (hydrocarbon wax, melting point: 79° C.): 15 parts

Ionic surfactant Neogen RK (manufactured by DKS Co., Ltd.): 2 parts

Ion-exchanged water: 240 parts

The above components were heated to 100° C., sufficiently dispersed with ULTRA-TURRAX T50 manufactured by IKA, then heated to 115° C. with a pressure discharge type Gaulin homogenizer and subjected to dispersion treatment for 1 h to obtain a release agent particle-dispersed solution having a volume average particle diameter of 160 nm and a solid fraction amount of 20%.

Production of Toner Particles 1

Resin particle-dispersed solution 1:500 parts

Resin particle-dispersed solution 2:400 parts

Colorant particle-dispersed solution: 50 parts

Release agent particle-dispersed solution: 80 parts

First, as a core forming step, the above materials were put into a round stainless steel flask and mixed. Subsequently, a homogenizer ULTRA-TURRAX T50 (manufactured by IKA) was used to disperse at 5000 r/min for 10 min. After adding a 1.0% aqueous nitric acid solution and adjusting the pH to 3.0, heating was performed to 58° C. while using a stirring blade in a water bath for heating and adjusting, as appropriate, the number of revolutions.

The volume average particle diameter of the formed aggregated particles was confirmed, as appropriate, using Coulter Multisizer III, and when the aggregated particles (core) having a size of 5.0 m were formed, a shell forming step was performed by adding the following materials and further stirring for 1 h to form shells.

Resin particle dispersion liquid 1:40 parts

Ion-exchanged water: 300 parts 10.0% by mass borax aqueous solution: 19 parts (Borax: sodium tetraborate decahydrate manufactured by Wako Pure Chemical Industries, Ltd.)

After that, as a spheroidization step, the pH was adjusted to 9.0 by using a 5% aqueous sodium hydroxide solution and heating was performed to 92° C. while continuing stirring.

When the desired surface shape was obtained, the heating was stopped, and as a cooling step, cooling was performed to 40° C. by quickly adding ice so that the cooling rate was 10° C./sec or more, and further, 3-h annealing was performed at 55° C. as an annealing step.

After that, cooling to 25° C. and filtration and solid-liquid separation were performed, followed by washing with ion-exchanged water. After the washing was completed, the toner particles 1 having a weight average particle diameter (D4) of 6.8 m were obtained by drying using a vacuum dryer.

External addition was performed with respect to the toner particles 1. A total of 100.0 parts of toner particles 1 and 1.3 parts of silica fine particles 1 were dry-mixed for 7 min using a Henschel mixer (manufactured by Mitsui Mining Co., Ltd.) to obtain a toner 1. Table 2 shows the physical characteristics of the obtained toner 1.

Production Examples of Toners 2 to 14

Toners 2 to 14 were obtained in the same manner as the toner 1, except that the formulations and conditions shown in Table 1 were changed. Table 2 shows the physical characteristics of the toners 2 to 14.

Production Example of Toner 15

Polyester resin 1:60.0 parts
Polyester resin 2:40.0 parts
Copper phthalocyanine pigment (Pigment Blue 15:3): 6.5 parts
Release agent (hydrocarbon wax, melting point 79° C.): 5.0 parts
Plasticizer (ethylene glycol distearate): 15.0 parts
Boric acid powder (manufactured by Wako Pure Chemical Industries, Ltd.): 1.5 parts The above materials were premixed with an FM mixer (manufactured by Nippon Coke Industries Co., Ltd.) and then melt-kneaded with a twin-screw kneading extruder (PCM-30 type manufactured by Ikegai Iron Works Co., Ltd.).

The obtained kneaded product was cooled and coarsely pulverized with a hammer mill, and after that, 130 parts of ethyl acetate was added, heating to 80° C. was performed, stirring was performed with T. K. Homomixer (Special Machinery Chemical Industry Co., Ltd.) at a rotation speed of 5000 rpm for 1 h, followed by cooling to 30° C. to obtain a solution.

A total of 400 parts of water and 5 parts of Eleminol MON-7 (manufactured by Sanyo Chemical Industries, Ltd.) were put in a separate container and set to 30° C. Then, 100 parts of the above solution was added while stirring with T. K. Homomixer (Special Machinery Chemical Industry Co., Ltd.) at a rotation speed of 13,000 rpm, and further stirring was performed for 20 min to obtain a slurry. The obtained slurry was desolvated at 30° C. under reduced pressure for 8 h while gently stirring, then aged at 45° C. for 4 h, and then toner particles 15 were obtained through washing, filtering, and drying steps. The toner particles 15 were subjected to external addition in the same manner as in the production of the toner 1 to obtain a toner 15. Table 2 shows the physical characteristics of the toner 15.

Production Examples of Comparative Toners 1, 2, 4, and 5

Comparative toners 1, 2, 4, and 5 were obtained in the same manner as the toner 1 except that the formulations and conditions shown in Table 1 were changed. Table 2 shows the physical properties of the comparative toners 1, 2, 4, and 5.

Production Examples of Comparative Toner 3

Polyester resin 1:50 parts
Polyester resin 2:40 parts
Copper phthalocyanine (Pigment Blue 15:3): 8 parts
Release agent (hydrocarbon wax, melting point 79° C.): 4 parts
Boric acid powder (manufactured by Wako Pure Chemical Industries, Ltd.): 1.5 parts The above materials were premixed with an FM mixer (manufactured by Nippon Coke Industries Co., Ltd.) and then melt-kneaded with a twin-screw kneading extruder (PCM-30 type manufactured by Ikegai Iron Works Co., Ltd.).

The obtained kneaded product was cooled, coarsely pulverized with a hammer mill, and then pulverized with a mechanical pulverizer (T-250 manufactured by Turbo Industries Co., Ltd.), and the obtained finely pulverized powder was classified with a multi-division classifier using the Coanda effect to obtain comparative toner particles 3 having a weight average particle diameter (D4) of 7.0 m.

The comparative toner particles 3 were subjected to external addition in the same manner as in the production of toner 1 to obtain a comparative toner 3. Table 2 shows the physical characteristics of the comparative toner 3.

TABLE 1

| | Core forming step | Shell forming step | | | Spheroidization step | Cooling step | Annealing step | | External addition step | |
|---|---|---|---|---|---|---|---|---|---|---|
| | 10% by mass borax aqueous solution (parts) | Resin particle-dispersed solution 1 (parts) | Ion-exchanged water (parts) | 10% by mass borax aqueous solution (parts) | Temperature (° C.) | Cooling rate (° C./sec) | Temperature (° C.) | Time (h) | Silica fine particles 1 (parts) | Time (min) |
| Toner1 | 0 | 40 | 300 | 19 | 92 | 10 | 55 | 3 | 1.3 | 7 |
| Toner2 | 0 | 40 | 300 | 19 | 92 | 10 | 55 | 3 | 1.0 | 7 |
| Toner3 | 0 | 40 | 300 | 19 | 92 | 10 | 55 | 3 | 1.6 | 7 |
| Toner4 | 0 | 40 | 300 | 10 | 92 | 10 | 55 | 3 | 1.3 | 7 |
| Toner5 | 0 | 40 | 300 | 60 | 92 | 10 | 55 | 3 | 1.3 | 7 |
| Toner6 | 0 | 40 | 300 | 29 | 93 | 10 | 55 | 3 | 1.3 | 7 |
| Toner7 | 0 | 40 | 300 | 19 | 91 | 0.5 | 55 | 3 | 1.7 | 7 |
| Toner8 | 35 | 40 | 300 | 0 | 91 | 0.1 | 55 | 3 | 1.3 | 7 |
| Toner9 | 35 | 40 | 300 | 0 | 91 | 0.1 | 55 | 3 | 1.7 | 3 |
| Toner10 | 35 | 40 | 300 | 0 | 93 | 10 | 55 | 3 | 1.7 | 15 |
| Toner11 | 15 | 40 | 300 | 0 | 91 | 0.1 | 55 | 3 | 1.7 | 15 |
| Toner12 | 0 | 40 | 300 | 60 | 91 | 0.1 | 55 | 3 | 1.7 | 15 |
| Toner13 | 5 | 40 | 300 | 0 | 91 | 0.1 | 55 | 3 | 1.7 | 15 |
| Toner14 | 35 | 40 | 300 | 0 | 91 | 0.1 | 55 | 3 | 1.7 | 15 |
| Comparative toner1 | 0 | 40 | 300 | 0 | 91 | 10 | 55 | 3 | 1.3 | 5 |
| Comparative toner2 | 35 | 40 | 300 | 0 | 93 | 10 | 55 | 3 | 1.1 | 3 |

TABLE 1-continued

| | Core forming step | Shell forming step | | | | | | | | External addition step | |
|---|---|---|---|---|---|---|---|---|---|---|---|
| | 10% by mass borax aqueous solution (parts) | Resin particle-dispersed solution 1 (parts) | Ion-exchanged water (parts) | 10% by mass borax aqueous solution (parts) | Spheroidization step Temperature (° C.) | Cooling step Cooling rate (° C./sec) | Annealing step Temperature (° C.) | Annealing step Time (h) | Silica fine particles 1 (parts) | Time (min) |
| Comparative toner4 | 0 | 40 | 300 | 19 | 88 | 0.02 | None | | 1.1 | 3 |
| Comparative toner5 | 0 | 40 | 300 | 19 | 88 | 0.02 | None | | 1.1 | 3 |

TABLE 2

| | | Average circularity | SF1 | ATR-IR boric acid peak | XRF boron intensity (kcps) | SF1 (cross section) | Area ratio (D/S) (%) | Silica fine particle coverage (% by area) | Silica fine particle dispersity evaluation index |
|---|---|---|---|---|---|---|---|---|---|
| Example1 | Toner1 | 0.98 | 108 | Present | 0.2 | 110 | 5 | 65 | 0.30 |
| Example2 | Toner2 | 0.98 | 110 | Present | 0.2 | 111 | 6 | 50 | 0.40 |
| Example3 | Toner3 | 0.98 | 110 | Present | 0.2 | 110 | 5 | 80 | 0.15 |
| Example4 | Toner4 | 0.98 | 108 | Present | 0.1 | 108 | 5 | 65 | 0.25 |
| Example5 | Toner5 | 0.98 | 108 | Present | 0.6 | 109 | 7 | 66 | 0.23 |
| Example6 | Toner6 | 0.99 | 105 | Present | 0.3 | 105 | 3 | 65 | 0.22 |
| Example7 | Toner7 | 0.96 | 120 | Present | 0.2 | 125 | 14 | 65 | 0.22 |
| Example8 | Toner8 | 0.95 | 125 | Absent | 1.0 | 128 | 15 | 85 | 0.10 |
| Example9 | Toner9 | 0.95 | 125 | Absent | 1.0 | 128 | 15 | 64 | 0.51 |
| Example10 | Toner10 | 0.98 | 112 | Absent | 1.0 | 114 | 7 | 85 | 0.53 |
| Example11 | Toner11 | 0.95 | 125 | Absent | 0.3 | 128 | 15 | 85 | 0.52 |
| Example12 | Toner12 | 0.95 | 125 | Present | 1.0 | 128 | 15 | 85 | 0.51 |
| Example13 | Toner13 | 0.95 | 125 | Absent | 0.1 | 128 | 15 | 85 | 0.51 |
| Example14 | Toner14 | 0.95 | 125 | Absent | 1.0 | 128 | 15 | 85 | 0.53 |
| Example15 | Toner15 | 0.97 | 110 | Absent | 0.1 | 153 | 18 | 42 | 2.10 |
| C.E. 1 | C.T. 1 | 0.97 | 109 | Absent | 0 | 109 | 6 | 65 | 1.30 |
| C.E. 2 | C.T. 2 | 0.99 | 102 | Absent | 0.3 | 102 | 2 | 41 | 2.00 |
| C.E. 3 | C.T. 3 | 0.94 | 135 | Present | 0.2 | 145 | 17 | 40 | 2.21 |
| C.E. 4 | C.T. 4 | 0.98 | 126 | Present | 0.1 | 136 | 15 | 43 | 2.05 |
| C.E. 5 | C.T. 5 | 0.97 | 130 | Present | 0.1 | 140 | 16 | 40 | 2.22 |

In Table 2, "C.E." denotes "Comparative Example" and "C.T." denotes "Comparative Toner".

Example 1

The following evaluation was performed for the toner 1.

Toner Evaluation

A modified commercially available Canon laser beam printer "LBP7600C" was used. The modification involved setting the rotation speed of the developing roller to a peripheral speed 1.5 times that of the drum by changing the gear and software of the evaluation machine main body.

In a low-temperature and low-humidity environment (15° C./10% RH), images were output in the following manner on a LETTER size Business 4200 paper (manufactured by XEROX, 75 g/m$^2$).

(1) Three solid images were output.

(2) Three grid patterns at 1 cm intervals with lines having a thickness of 100 μm (thickness in an electrostatic latent image) were output.

(3) One solid image was output, and the transfer residual toner on the photosensitive member after the solid image transfer was taped with Mylar tape and peeled off.

(4) 4000 images with a print percentage of 1% were output. After that, three of the grid patterns were output again.

(5) Three solid images were output.

(6) Three grid patterns at 1 cm intervals with lines having a thickness of 100 μm (thickness in an electrostatic latent image) were output.

(7) One solid image was output, and the transfer residual toner on the photosensitive member after the solid image transfer was taped with Mylar tape and peeled off.

Initial Transferability

The tape obtained in (3) and a tape that was not subjected to taping were attached to a LETTER size Business 4200 paper (75 g/m$^2$, manufactured by XEROX Corp.). The difference in reflectance on each tape surface was evaluated based on the following criteria. The evaluation of C or higher corresponds to an acceptable level.

A: less than 0.6%.

B: 0.6% or more and less than 1.2%.

C: 1.2% or more and less than 2.0%.

D: 2.0% or more and less than 3.0%.

E: 3.0% or more

Initial Transfer Dust

The third grid pattern image output in (2) was observed using a loupe with a magnification of 25 times, and transfer dust (a phenomenon in which a toner is scattered around characters and line images) was evaluated based on the following criteria. The evaluation of C or higher corresponds to an acceptable level.

A: the lines are very sharp and there is almost no transfer dust.

B: the lines are sharp with only a slight amount of toner scattered.

C: the toner is somewhat spattered, but the lines are relatively sharp.

D: there is a lot of toner spattering, and the line shape is blurred.

Transferability in Durability Test

The tape obtained in (7) and a tape that was not subjected to taping were attached to a LETTER size Business 4200 paper (75 g/m$^2$, manufactured by XEROX Corp.). The difference in reflectance on each tape surface was evaluated based on the following criteria. The evaluation of C or higher corresponds to an acceptable level.

A: less than 0.6%.

B: 0.6% or more and less than 1.2%.

C: 1.2% or more and less than 2.0%.

D: 2.0% or more and less than 3.0%.

E: 3.0% or more.

Transfer Dust in Durability Test

The third grid pattern image output in (6) was observed using a loupe with a magnification of 25 times, and transfer dust (a phenomenon in which a toner is scattered around characters and line images) was evaluated based on the following criteria. The evaluation of C or higher corresponds to an acceptable level.

A: the lines are very sharp and there is almost no transfer dust.

B: the lines are sharp with only a slight amount of toner scattered.

C: the toner is somewhat spattered, but the lines are relatively sharp.

D: there is a lot of toner spattering, and the line shape is blurred.

Developing Performance in Durability Test

The image density was measured by measuring the relative density with respect to an image with a white background with an image density of 0.00 by using "Macbeth Densitometer RD918" (manufactured by Macbeth Co., Ltd.) according to the instruction manual provided with the device, and the obtained relative density was used as the value of image density. The developing performance in a durability test was determined by a density decrease degree. The density decrease degree was evaluated according to the following criteria with respect to a value of the difference between the initial density and density after the durability test, where the average value of the center density of each of the three images output in (1) was taken as the initial density, and the average value of the center density of each of the three images output in (5) was taken as the density after the durability test. The evaluation of C or higher corresponds to an acceptable level.

A: less than 0.05.

B: 0.05 or more and less than 0.1.

C: 0.1 or more and less than 0.15.

D: 0.15 or more and less than 0.20.

E: 0.20 or more.

Examples 2 to 15

The same evaluation as in Example 1 was performed using toners 1 to 15, respectively. The evaluation results are shown in Table 3.

Comparative Examples 1 to 5

The same evaluation as in Example 1 was performed using the comparative toners 1 to 5, respectively. The evaluation results are shown in Table 3.

TABLE 3

| | | Initial transferability | Initial transfer dust | Transferability after durability test | Transfer dust after durability test | Developing performance after durability test |
|---|---|---|---|---|---|---|
| Example 1 | Toner 1 | A (0.3) | A | A (0.4) | A | A (0.01) |
| Example 2 | Toner 2 | A (0.4) | A | B (1.1) | B | A (0.04) |
| Example 3 | Toner 3 | B (0.7) | A | B (0.7) | A | A (0.02) |
| Example 4 | Toner 4 | A (0.3) | B | B (0.6) | B | A (0.04) |
| Example 5 | Toner 5 | A (0.3) | A | A (0.4) | A | A (0.03) |
| Example 6 | Toner 6 | A (0.3) | B | A (0.5) | B | A (0.02) |
| Example 7 | Toner 7 | B (1.0) | A | B (1.1) | A | B (0.07) |
| Example 8 | Toner 8 | B (1.0) | B | C (1.7) | C | C (0.13) |
| Example 9 | Toner 9 | C (1.3) | C | C (1.4) | C | C (0.12) |
| Example 10 | Toner 10 | B (1.0) | B | B (1.1) | B | B (0.07) |
| Example 11 | Toner 11 | C (1.3) | C | C (1.4) | C | C (0.12) |
| Example 12 | Toner 12 | C (1.3) | C | C (1.4) | C | C (0.12) |
| Example 13 | Toner 13 | C (1.4) | C | C (1.9) | C | C (0.14) |
| Example 14 | Toner 14 | C (1.3) | C | C (1.7) | C | C (0.13) |
| Example 15 | Toner 15 | A (0.5) | B | C (1.9) | C | C (0.14) |
| C.E. 1 | C.T. 1 | A (0.5) | D | D (2.1) | D | D (0.19) |
| C.E. 2 | C.T. 2 | A (0.3) | D | A (0.5) | D | B (0.06) |
| C.E. 3 | C.T. 3 | E (4.8) | B | E (5.6) | B | D (0.19) |
| C.E. 4 | C.T. 4 | C (1.8) | D | D (2.9) | D | C (0.14) |
| C.E. 5 | C.T. 5 | D (2.9) | C | E (4.1) | D | D (0.19) |

In Table 3, "C.E." denotes "Comparative Example" and "C.T." denotes "Comparative Toner".

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2021-123719, filed Jul. 28, 2021, which is hereby incorporated by reference herein in its entirety.

What is claimed is:

1. A toner, comprising:

a toner particle comprising a binder resin and boric acid;

the toner having a shape factor SF1(T) of 105 to 110; and a cross-section of the toner formed by a cross-section polisher method having a shape factor SF1(CS) of 105 to 120, wherein the toner has an average circularity of 0.95 or more, and an intensity of boron is 0.1 to 0.6 kcps in fluorescent X-ray measurement of the toner particle.

2. The toner according to claim 1, wherein boric acid is detected in the IR analysis of the toner particle by an ATR method using germanium as an ATR crystal.

3. The toner according to claim 1, wherein D/S is 3 to 14% when D is a total area of a contact surface between 50 toners and a flat glass plate when the toner is dropped and laid on the flat glass plate in a horizontal position from 10 cm thereabove while sieving with a 22 μm mesh for 10 sec, and S is a total projected area of the 50 toners.

4. The toner according to claim 1, wherein the toner further comprises an external additive that comprises a silica fine particle, and a surface of the toner particle is 50 to 80% by area covered by the silica fine particle, measured by X-ray photoelectron spectroscopy.

5. The toner according to claim 4, wherein the silica fine particle on the surface of the toner has a dispersity evaluation index of 0.10 to 2.00.

6. A method for producing a toner comprising a toner particle comprising a binder resin and boric acid, the method comprising steps (1) to (3) in the order listed:

(1) preparing a binder resin fine particle-dispersed solution comprising the binder resin;

(2) aggregating the binder resin fine particles comprised in the binder resin fine particle-dispersed solution to form an aggregate; and (3) heating and fusing the aggregate, wherein a boric acid source is added in at least one of step (2) and step (3), the toner has a shape factor SF1(T) of 105 to 110, a cross-section of the toner formed by a cross-section polisher method has a shape factor SF1(CS) of 105 to 120, the toner has an average circularity of 0.95 or more, and an intensity of boron is 0.1 to 0.6 kcps in fluorescent X-ray measurement of the toner particle.

7. The method for producing the toner according to claim 6, wherein step (2) comprises steps (2-1) and (2-2) in the order listed:

(2-1) aggregating the binder resin fine particles comprised in the binder resin fine particle-dispersed solution to form the aggregate, and (2-2) forming an aggregate having a shell by further adding resin fine particles comprising a resin for a shell to the binder resin fine particle-dispersed solution comprising the aggregate, and aggregating the resin fine particles comprising a resin for a shell.

8. The method for producing the toner according to claim 6, comprising steps (4) to (6) performed in the order listed during or after step (3):

(4) a spheroidization step of heating the aggregate by further raising the temperature, (5) a step of cooling the aggregate at a cooling rate of 0.1° C./sec or higher, and (6) an annealing step of heating and holding the aggregate to a temperature equal to or higher than the crystallization temperature or glass transition temperature of the binder resin.

9. The toner according to claim 1, wherein SF1(CS) is 109 to 110, and a surface of the toner particle measured by X-ray photoelectron spectroscopy is 60 to 70% by area covered by the silica fine particle.

* * * * *